United States Patent [19]

Del Rosso

[11] 4,114,707
[45] Sep. 19, 1978

[54] WEIGHING AND TRANSPORTING SYSTEM
[75] Inventor: Victor Del Rosso, Ithaca, N.Y.
[73] Assignee: Hi-Speed Checkweigher Co., Inc., Ithaca, N.Y.
[21] Appl. No.: 758,918
[22] Filed: Jan. 13, 1977
[51] Int. Cl.² .......................................... G01G 19/00
[52] U.S. Cl. ...................................... 177/145; 177/1; 198/504
[58] Field of Search ....................... 177/145, 52, 16, 1, 177/52, 53; 198/504, 505; 209/121

[56] References Cited
U.S. PATENT DOCUMENTS

| | | |
|---|---|---|
| 2,308,729 | 1/1943 | Walter .................................. 209/121 |
| 2,521,876 | 9/1950 | Stake .................................. 209/121 X |
| 2,633,972 | 4/1953 | Capstack .............................. 198/505 |
| 2,939,569 | 6/1960 | Roach ............................... 198/504 X |
| 3,006,469 | 10/1961 | Craig .................................. 177/52 X |
| 3,196,964 | 7/1965 | Allen ........................................ 177/3 |

Primary Examiner—Joseph W. Hartary

[57] ABSTRACT

A weighing system for articles in a production line. The system intermittently transports the weighed articles by means of pushing flights away from the weighing scale to a lateral position at which the article is either picked off of the article transporter or is left on the transporter for ultimate disposition by dumping off of the end of the transporter.

13 Claims, 5 Drawing Figures

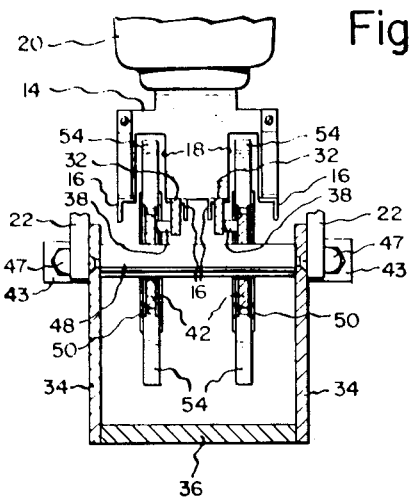
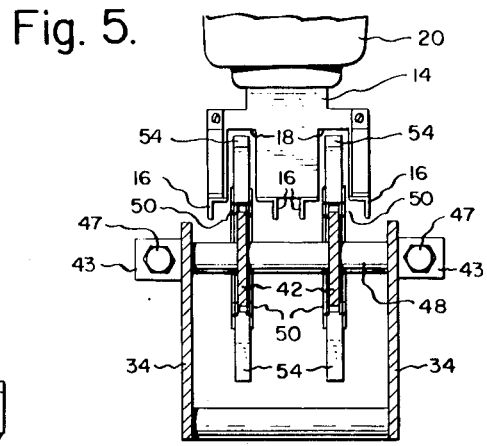
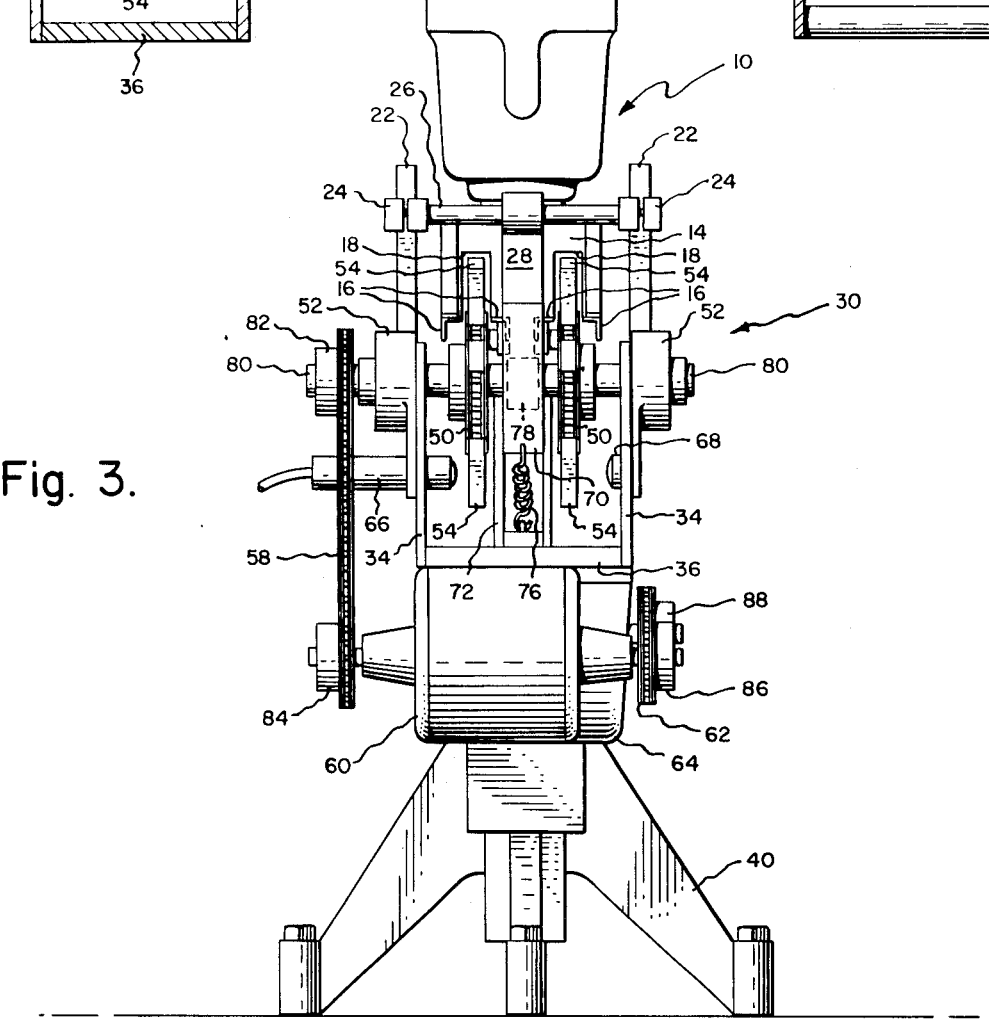

WEIGHING AND TRANSPORTING SYSTEM

BACKGROUND OF THE INVENTION

1. Field of the Invention

The present invention relates to a weighing and transporting system for weighing and transporting articles in a high volume production line. More specifically, the invention relates to a transporter which rapidly moves the articles off of the weighing scale in order to clear the scale for the next article to be weighed. The system also rapidly separates the acceptable articles from the unacceptable articles.

2. Description of the Prior Art

It is well known for example in the art of packaging to utilize a production line process for filling individual containers such as pouches with the desirable product such as a food stuff. Packaging production lines, however, do not always provide uniform filling so that the sealed pouches may have differing final weights. It is generally unacceptable to market a product having varying weights so it is essential to checkweigh the individual pouches. Indications of pouch weight permits the rejection of underweight pouches and the determination of the performance of the filling machine.

It is desirable to weigh the individual pouches as close to the filling operation as possible. In doing so, the filling machine operator is given immediate information regarding the performance of the filling machine. With this information, immediate adjustments to the filling machine may be made. Thus, it has been conventional to weigh the pouches by automatic checkweighers immediately after the pouches have been discharged from the filling machine. However, recent advances in the design of filling machines have increased the speed of the filling machines beyond the capacity of the so called static type checkweighers which are often preferred due to their high accuracy, their precise article placement and their open design which resists jamming caused by spillage.

Prior art checkweighers separate unacceptable pouches from acceptable pouches at the position of the checkweigher scale. Multiple actions are commonly required to accomplish the separation. Thus, one device is used to move the acceptable pouch away from the checkweigher scale while a separate device is used to move the unacceptable pouch in another direction. Conventional arrangements include tilting platforms and/or reciprocating pushers which interfere with one another in their actuated positions. Thus, before one of the devices could be actuated, the action of the other device would have to be completed in order to avoid interference. These prior devices were particularly time consuming since one-half of the total time required for the completion of the action would elapse during the unproductive return stroke of the reciprocating devices.

The potential for interference in the prior art devices and the need to wait for the previous action to be completed not only resulted in complication of the control systems but also resulted in limitation of the maximum capacity of the checkweigher system with the result that the checkweigher scale encumbered the production line and limited its ultimate speed. Thus, a need exists for a checkweigher system which is more economical in its utilization of time required to clear the checkweigher scale of the weighed product and to separate the unacceptable products from the acceptable product.

SUMMARY OF THE INVENTION

These and other objects are provided by the subject invention. Instead of relying on reciprocating devices which move a weighed article directly off of the weigh-platform of the scale, the present invention provides a non-reciprocating transporter which sweeps the weigh-platform clear of the weighed article thereby clearing the weigh-platform for subsequent placement thereon of the next article.

The transporter includes a coupled pair of intermittently driven chains having flights attached thereto. The flights penetrate through slots in the weigh-platform and through an adjacent support surface so that the flights engage the article while on the weigh-platform and move the article off of the weigh-platform and onto the adjacent support surface.

The chain and flights are controlled to temporarily halt movement of the article in a position at which a separate device may selectively remove the article from the transporter. Thus, if the weight of the article is acceptable, the article may be removed and placed on a conveyor which takes it to a packing station. If the article is underweight, the article remover is disabled and the article remains on the transporter. Subsequent movement of the flights cause the article which remains on the transporter to move to the end of the support surface where it is dumped as a reject.

BRIEF SUMMARY OF THE DRAWINGS

These and other desirable features may be better understood and their numerous objects and advantages will become apparent to those skilled in the art by reference to the accompanying drawings wherein like reference numeral refer to like elements in the several figures and in which:

FIG. 3 is an end view of the checkweigher of FIG. 1 taken along the view lines 3—3 of FIG. 1;

FIG. 4 is a cross-sectional view of the apparatus of the invention taken along the view lines 4—4 of FIG. 1; and FIG. 5 is a detail of the checkweigher arm and weigh-platform taken along the view lines 5—5 of FIG. 1.

DESCRIPTION OF THE PREFERRED EMBODIMENT

Figure 2:
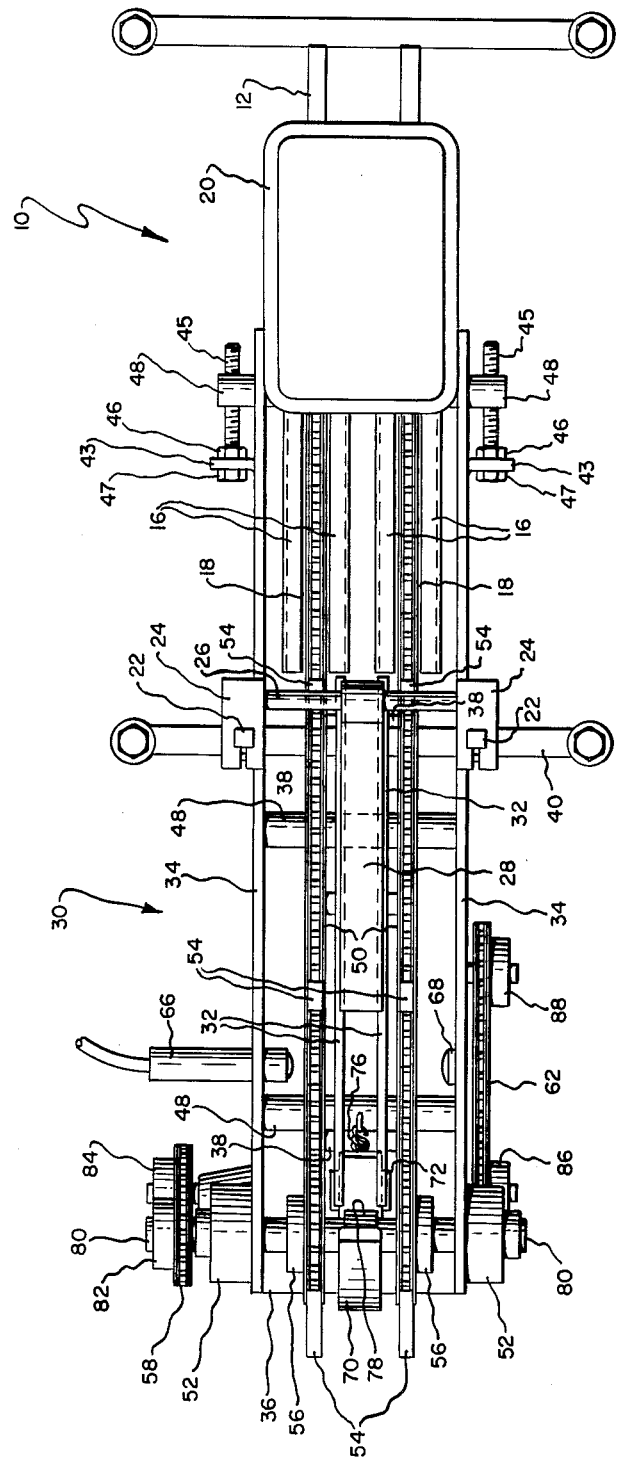
FIG. 2 is a plan view of the device of FIG. 1 taken along the view lines 2—2 of FIG. 1.

In a preferred embodiment of the invention, the checkweighing system comprises a checkweigher, generally indicated at 10, and a transporter, generally indicated at 30. Checkweigher scale 20 is supported on a support stand 12 and has projecting downwardly therefrom an arm 14 which is attached to and supports the weigh-platform 16. The checkweigher scale 20 is a conventional checkweigher commercially available in the marketplace; the details of which do not constitute a part of this invention. The weigh-platform 16, as best seen in FIG. 2, includes a multiplicity of laterally projecting fingers separated by laterally extending slots 18. Furthermore, the support arm 14 has upwardly extending slots therein to permit the passage of upwardly projecting flights 54 therethrough (to be described in detail hereinafter). In the operation of the checkweigher, the pouches to be weighed are placed on the weigh-platform 16 by a device which is usually a part of the filling machine. The placing device may be a pneumatically actuated arm which picks up the pouch with an induced suction, swings over into position for placing the pouch on the weigh-platform 16, and breaks the suction thereby releasing the pouch onto the weigh-platform 16. Such pneumatically actuated placing devices are commercially available and constitute no part of the present invention.

The checkweighing system of the present invention further includes a transporter 30 which is positioned immediately under the checkweigher weigh-platform 16 as well as extending laterally to the side thereof. The pouch transporter 30 is supported by an independent stand 40 so that vibrations originating in the transporter 30 are not transmitted to the checkweigher scale 20. Affixed to the stand 40 is a base plate 36 which provides support for a driving motor 64 and a clutch-brake combination 60 as well as for the remainder of the transporter system.

A pair of side rails 34 are affixed to the sides of the base plate 36 and project upwardly therefrom. Ideler shafts 48 span the gap between the side rails 34. Mounted on ideler shafts 48 are a pair of chain bars 42 for carrying a pair of chains 50. Each of the chains 50 passes over and is driven by its own respective chain sprocket 56, the pair of which are coupled by common drive shaft 80. Attached to each of the continuous chain loops 50 are equally spaced upstanding flights 54.

As best seen in FIG. 4, support rails 32 are suspended from the chain bars 42 by support means 38. The upper surfaces of support rails 32 act as a stationary support surface along which a pouch may be slid by movement of the flights 54. One end of the support rails 32 lies adjacent to the weigh-platform 16 in order that they may receive pouches therefrom. The other end of the support rails 32 terminate in such a manner that the pouches may be pushed off of them by flights 54.

Figure 1:
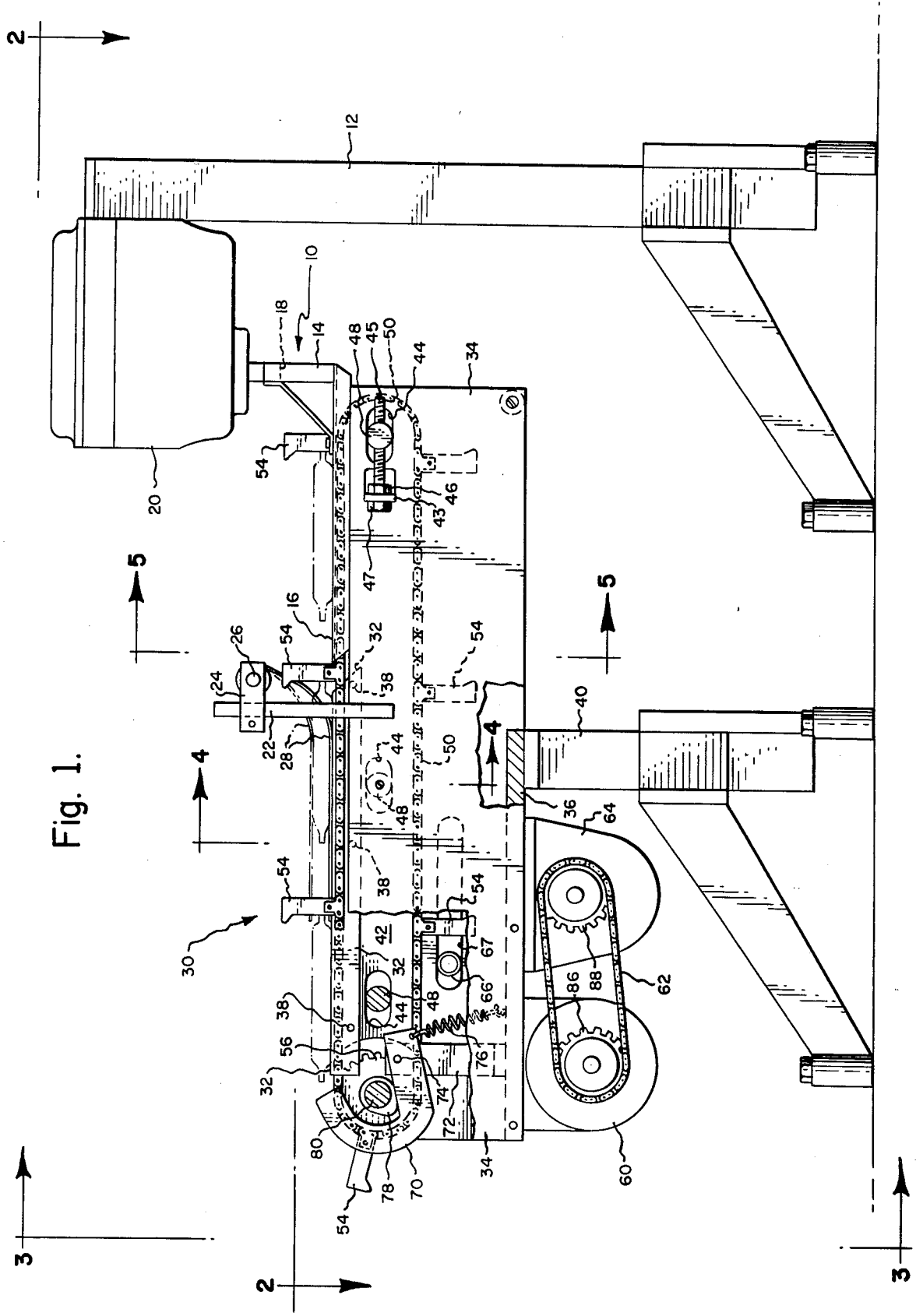
FIG. 1 is a side view of a checkweigher system of the present invention.

In order to provide for proper tensioning of the chains 50 so that the flights 54 are firmly positioned throughout their travel along the upper surface of the chain bar 42, an adjustable means is provided which permits the chain bar 42 to be fixed in various longitudinal positions. The means provided for this adjustable chain bar feature includes an elongated slot 44 through the chain bar 42 and through which the ideler shafts 48 pass. Elongated slots 44 permit the longitudinal adjustment of the chain bar 42. At the extreme right end of the transporter 30, as shown in FIGS. 1 and 2, a take-up device is provided including an angle iron 47 attached to the chain bar 42, a take-up screw 45 threadedly engaging the take-up shaft 48 and take-up nuts 46 and 47 also threadedly engaging the take-up screw 45. By this means, it can be seen that rotational adjustment of the take-up screw 45 acts to translate the take-up angle 43 and thus the chain bar 42 in a longitudinal direction. After adjustment, chain bar 42 may be locked into the appropriate adjusted position by nuts 46 and 47 respectively.

As can be seen from an examination of FIG. 1, the drive chains 50 and consequently the flights 54 comprise a closed loop so that counter-clockwise rotation of sprocket 50 causes the flights on the upper surface of the transporter to advance to the left. At the same time the flights on the lower surface of the transporter are advanced to the right. In this manner the flights traverse a closed continuous loop and return to their starting points without reversing their motion and without backtracking along the same path.

As previously described, sprockets 56 are driven by common drive shaft 80 which is in turn driven by chain sprocket 82. Chain sprocket 82 is driven by a chain 58 which also engages a chain sprocket 84. Chain sprocket 84 in turn is driven by the clutch-brake unit 60 which receives its motivating power from the motor 64 via motor sprocket 88, chain 62 and chain sprocket 86. In the preferred embodiment of the invention, it is desirable to intermittantly advance the flights 54 and consequently the chain 50. Whereas motor 64 continuously drives chain 62, the clutch-brake unit 60 is provided to break this continuous driving force into an intermittantly applied driving force as hereinafter described.

Clutch-brake unit 60 is responsive to a signal from photoelectric sensor 66 which is adjustably positioned along slot 67 to detect the passage of one of the flights 54. Photoelectric unit 66 emits a light beam which traverses the space across which flights 54 pass, is reflected by a reflector 68, and returns to unit 66 which generates a signal indicative of either the presence or absence of a flight 54. Photoelectric eye 66 most desirably operates in the infra-red so that stray light sources do not interfere with the system. The signal is delivered to a control unit (not shown) which in turn controls the clutch-brake unit 60. Thus, when a flight 54 passes in front of the scanner 66, the clutch disengages and the brake engages so that the chain 50 is temporarily stopped. As is evident, the temporary stopping position of the pouch being advanced by the chain may be precisely adjusted by the adjustment of the position of the scanner 66 along the slot 67.

Subsequently, a delay provided by the control system permits the disengaged state of the system for a predetermined period of time during which one pouch on the scale is weighed and another pouch along the transporter is picked off of the transporter if it has been determined to meet the appropriate weight characteristics. After the lapse of this predetermined time, the clutch-brake is permitted to re-engage so that chains 50 and flights 54 resume their motion until the next flight 54 passes in front of the scanner 66 at which time the cycle is repeated.

The intermittant motion thereby produced permits sufficient time for the scale to make a weight determination at the right hand end of the transporter and for the pouches to come to rest at the left hand end of the transporter so that they may be picked off of the transporter or permitted to remain on the end of the transporter as desired. A common pick-off technique is to use an arm which swings down and contacts the stationary pouch and then lifts the pouch off of the transporter by means of a vacuum drawn through a hole in a contact plate on the end of the contact arm. Such pick-off arms are commercially available and well understood by those skilled in the art: the details of which do not constitute a part of the present invention. It should be recognized that this type of pick-off arm is only one alternative of many that are commercially available.

As best seen in FIG. 1, a means may be provided at the left hand end of the transporter 30 (the discharge end) for assuring the adequate positioning of the pouch in order that the pick-off arm work effectively in nearly all cases. Thus, C-hook 70 is provided at the discharge end of the transporter 30 in order to restrain pouches as they advance to that position and to align the pouches so that all of the pouches reaching that position have a common orientation and position. This facilitates the operation and efficiency of the pick-off action. C-hook 70 is pivotally mounted on a pivot pin 74 which is in turn mounted on a support column 72 attached to the base plate 36. In addition, the C-hook 70 is spring loaded by springs 76 to have a preferred pouch blocking position. If the pouch is a reject to be discharged off of the end of the transporter, the feed hook 70 must be moved from its pouch blocking position to permit the discharge of the pouch from the end of the transporter and then retruned to its pouch blocking position in order to adequately block and align the succeeding pouch. Thus, there is provided a cam 78 attached to drive shaft 80 so that the cam lobe acts to push the C-hook down out of the way when the intermittant motion of the transporter resumes and when a reject pouch is pushed off of the end of the transporter by flight 54.

In order to assure the smooth transfer of the pouches from the weigh scale 16 to the support rails 32 and in order to assure that the pouches do not bounce off of the transporter during the intermittant driving motion of the transporter, a hold-down means is provided. The hold-down means comprises a spring steel leaf spring 28 under which the pouches are slid and which acts to press the pouches against the support rail 32. Holddown spring 28 is positioned and held in its hold-down position by means of verticle supports 22, connecting members 24 and horizontal support 26.

The operation of the system of the present invention is as follows: The checkweigher 10 and the transporter systems 30 are coordinated to synchronize with the pouch filling machine. After a pouch has been filled and sealed by the pouch filling machine, a vacuum actuated arm places the filled pouch on the weigh-platform 16 at a time that the transporter 30 is stationary. During the period of about one-fifth of a second, the checkweigher 10 weighs the pouch and determines whether the pouch is unacceptable because it is underweight or is acceptable as containing a sufficient quantity of the product. The transporter 30 is then actuated so that the chain loops 50 are driven by an amount equivalent to the spacing between two of the adjacent flights 54. The spacing of the adjacent flights 54 is such that during this period of movement, the pouch is removed from the weigh-platform 16 so that the weigh-platform 16 is cleared for the receipt of the next successive pouch. Thus, the pouch is advanced along the transporter 30 in a series of steps and comes to rest at a series of lateral positions. When the pouch is stationary at one of these positions, a pick-off means is actuated to pick the pouch off of the transporter 30 if the pouch has been previously determined by checkweigher 10 to have an acceptable weight. If the pouch meets the weight requirements, the pick-off arm removes the pouch and places it on a conveyor or the like which removes the pouch to another process line or to a packing station. At the same time that this is occuring, another pouch is being placed on the weighing platform 16 and is being weighed by checkweigher 10. Consequently, the arrangement of the transporter and the intermittant motion thereof permits the simultaneous actions of placing a new pouch on the scale to be weighed and of removing acceptable pouches from the transporter 30 at a position spaced from the checkweigher weigh-platform 16.

When a pouch is determined to be unacceptable due to an inadequate weight, the pick-off arm is disabled so that the pouch is left undistribed on the transporter 30. Subsequent motion of the flights 54 of the transporter causes the rejected pouch to be advanced to the end of the transporter support surface 32 where it is discharged or dumped off of the end thereof into a bin or other means provided for receiving rejected pouches. It should be noted that at the same time that the rejected pouch is being advanced to the ends of the transporter 30 for ultimate discharge, another flight 54 is engaging another pouch on the weigh-platform 16 and advancing this weighed pouch off of the platform 16. Consequently, the rejection action and the scale clearing action occur simultaneously.

As can be appreciated, the system of the present invention permits the checkweighing operation to be accelerated due to the fact that there are no reciprocating actions which consume half of the time of actuation in an unproductive return motion of a reciprocating element. Additionally, the system of the present invention sweeps the weighed packets off of the weigh-platform as soon as the pouch has been weighed so that the separation of the acceptable and unacceptable pouches is accomplished at a position separated from the weighed platform. Thus, the separation procedure does not interfere with the loading of the weigh-platform and the weighing of the individual pouches. Furthermore, the system of the present invention has the additional advantage that it eliminates one of the steps necessary to separate the acceptable and unacceptable pouches in that only the acceptable pouches undergo a handling step whereas the unacceptable pouches are simply advances until they fall off of the end of the transporter 30. Finally, the speed of the system is increased over the prior art devices as a result of the fact that the scale loading and transporter unloading steps are accomplished simultaneously, as well as the fact that the unacceptable pouch discharge and the scale clearing steps are also carried out simultaneously.

What is claimed is:

1. An apparatus for transporting weighed articles rapidly away from a weighing station, including a scale, to a precisely located predetermined lateral position with the center of the article positioned at said lateral position, while clearing the weighing station in preparation for receiving the next article to be weighed, wherein said apparatus comprising:
   a. a weigh-platform operatively connected to said scale;
   b. independent support means which may be positioned adjacent to said weigh-platform for receiving and supporting weighed articles placed thereon after discharge from said weigh-plaform;
   c. means adjacent to said weigh-platform for engaging and discharging weighed articles from said weigh-platform to said independent support means and for moving said weighed articles away from said weigh-plaform, said means including a pushing means which follows a closed continuous non-reversing path;
   d. detecting means mounted so as to be positionally adjustable along the path of said pushing means for detecting the position of said pushing means and for generating a control signal indicative thereof; and
   e. means responsive to said control signal and operatively connected to said article engaging and moving means for intermittently driving said article engaging and moving means in a non-reversing, start-stop manner so that a succession of weighed articles may be intermittently discharged from said weigh-platform and whereby the stationary position of said pushing means may be adjustably regulated by adjustably positioning said detecting means.

2. The apparatus as recited in claim 1 wherein said intermittantly driving means includes a motor and a clutch-brake unit.

3. The apparatus as recited in claim 2 wherein said article engaging means includes an endless loop having article pushing flights connected thereto.

4. The apparatus as recited in claim 3 wherein said endless loop includes a chain loop and wherein said apparatus further includes a chain bar on which said chain loop is mounted.

5. The apparatus as recited in claim 4 further including a chain sprocket which engages and drives said chain loop at one end thereof.

6. The apparatus as recited in claim 5 further including means operatively connected to said chain bar for longitudinally adjusting the position of said chain bar.

7. The apparatus as recited in claim 3 wherein said endless loop is positioned under said weigh-platform and further wherein said weigh-platform is interrupted to permit the penetration of said flights above the upper surface of said weigh-platform.

8. The apparatus as recited in claim 7 further including a dog means pivotally mounted in an article movement blocking position for positioning said weighed articles in preparation for their removal from said support means.

9. The apparatus as recited in claim 1 wherein said independent support means includes a stationary support means adjacent to said weigh-platform for supporting weighed articles placed thereon, and wherein said engaging means includes means for sliding said weighed articles from said weigh-platform to said support means and subsequently along the length of and off of the end of said support means.

10. The apparatus as recited in claim 9 wherein said chain loop is positioned under both of said weigh-platform and said stationary support means and further wherein said weigh-platform and said stationary support means are interrupted to permit the penetration of said flights above their respective upper surfaces.

11. A method for sequentially weighing a plurality of similarly sized articles in a production line at a weighing station having a weighing scale and a pushing means with a plurality of pushing flights which follow an endless closed path, said pushing means being driven by a non-reversing driving means which may be intermittently started and stopped, said driving means being responsive to a control signal generated by a detector capable of being adjustably positioned along the path of said pushing means, wherein the method comprising the steps of:

a. adjusting the position of said detector dependent upon the size of the articles to be weighed so that a signal from said detector to said driving means may be effective to halt said driving means with one of said flights in a position in close proximity to the weighing position of the next article to be weighed without actually contacting said article;

b. placing an article to be weighed on the weigh-platform of said weighing scale in close proximity to but not touching said flights;

c. weighing the article;

d. actuating said driving means so as to cause one of said flights to contact one side of said weighed article and to push said weighed article from the scale;

e. detecting the degree of advancement of said pushing means by said detector and generating a control signal indicative of the position of the pushing means for delivery to said driving means;

f. in response to said control signal, halting said pushing means to position one of said flights in said position in close proximity to the weighing position of the next article to be weighed; and g. repeating steps (b), (c), (d), (e), and (f).

12. The method as recited in claim 11 further including the steps of pushing the article after it has been weighed onto a support surface and transporting it to a predetermined laterally displaced position; and selectively removing said weighed article from said support surface at said predetermined position dependent upon the article's measured weight while placing the next article to be weighed on the scale and weighing it.

13. The method as recited in claim 11 wherein said method includes the step of causing pushing flights to penetrate through slots formed in said weigh-platform to an elevation above the weigh-platform and pushing the article in a direction parallel to the slots by causing said pushing flights to move along said slots.

* * * * *